Patented Apr. 2, 1929.

1,707,468

UNITED STATES PATENT OFFICE.

WILLIAM HUNTER VOLCK, OF WATSONVILLE, CALIFORNIA, ASSIGNOR TO CALIFORNIA SPRAY-CHEMICAL COMPANY, OF WATSONVILLE, CALIFORNIA, A CORPORATION OF CALIFORNIA.

PARASITICIDAL OIL.

No Drawing. Application filed September 8, 1926. Serial No. 134,329.

What may be designated as phytonomic oils are certain classes of oils by means of which plant life can safely be regulated and protected from the depressing and frequently destructive action of parasites, such as insects, fungus growths, etc. The cheapest and best of these phytonomic oils hitherto known, have been chiefly those oils characterized as white liquid petrolatums commercially represented in this country by "white oils", such as "Nujol", "Markol", "Wyrol", Crystal oronite, and the like, which I have selected, emulsified, diluted and adapted to general use as plant parasiticides.

These oils may in general be made by selecting that portion of good paraffin base crude petroleum commonly known as "lubricating stock" of suitable viscosity and subjecting it to treatment with fuming sulfuric acid of a strength known as 105% oleum until it is sufficiently sulfonated to produce a good white oil, thereupon neutralizing by washing with caustic soda, steam distilling the washed oil and finally filtering it through fuller's earth or the like. As crude petroleum stocks and consequently the lubricating stocks differ it is impossible to specify exactly what portion to select for each of the above oils; more particularly since the above treatment modifies the gravity and viscosity of the stock used to some extent and some stock requires repeated treatment with oleum or caustic soda or both. Experience, however, enables the operator on a suitable stock to so select the portion taken for making

|  | Markol | Wyrol | Nujol | Crystal oronite |
|---|---|---|---|---|
| As to obtain sp. g. | .835–.840 | .880–.885 | .880–.885 | .850–.870 |
| Saybolt viscosity 100°.. | 70–75 | 120–130 | 210–220 | 100–110 | and still repeat some or all the above treatments until the product is practically water-white, gives only a light straw color when mixed with an equal volume of concentrated sulfuric acid, and is practically free from petroleum taste and odor. Methods of similarly refining the suitable stocks derived from other and different crude petroleums are well known to those engaged in the industry.

It has hitherto been supposed that the best obtainable oils of this class owed their phytonomic character to the absence in the oil when applied of impurities such as unsaturated hydrocarbons, sulfur and the like.

I have now discovered that exposure to air, high temperature, light, or certain rays, or the like, or exposure to certain combinations of these agents, is capable of so modifying some phytonomic oils (or at least certain constituents thereof) that they become actively phytocidal and I have in many cases been able to reproduce these changes in the laboratory and within the period of laboratory experiment. For example, if a sample of any of the present white oils of commerce is exposed to the air in an open vessel and held at a temperature of 100° C., oxidation products will appear in 24 to 48 hours, according to the actual temperature and the specific nature of the sample.

I believe that these oxidation products are largely napthenic acids in various stages of synthesis by oxidation from certain components of the oil. The completely formed napthenic acids are similar to the fatty acids naturally occurring in animal and vegetable oils. They have a strong characteristic odor and may be detected by the odor when present in very small amounts. The development of napthenic acid odors in white oils is in a way analogous to the development of rancidity in animal and vegetable oils, the difference being that rancidity in animal and vegetable oils is due to the release of existing fatty acids and possibly to their further alteration—while rancidity in a white oil I believe depends on the production of acids not previously existing. With this reservation the deterioration of white oils by oxidation might be spoken of as the development of rancidity.

The importance of this "rancidity" in phytonomic oils is due to the fact that the napthenic acids or other degeneration products are very toxic to plant tissue—whereas the original white oil as hitherto used by me is for practical purposes free from toxicity to plant tissue and might be applied freely in the control of insects and other plant parasites when it remained substantially unchanged. The rancidity which develops in white oils at about 100° C. also takes place at lower temperatures but much more slowly. Under ordinary laboratory conditions, it may require several months for perceptible rancidity to develop in a given sample of white oil.

I believe the rate of oxidation or other degeneration is greatly influenced by the extent of the surface exposed to the air, as well as by the sunlight increasing the rapidity of the development of rancidity in oils. It is well known that nascent oxygen is much more active than the oxygen of the air.

It is certainly a fact that a very thin oil film spread over the surface of a growing plant and partly penetrating the intercellular spaces of the leaves, is in a condition favoring rapid degeneration of the oil, and if at the same time the temperature rises abnormally high (38° C. or 100° F., or above), this tendency may be so enhanced as to bring about a condition of toxicity which is detrimental to the plant tissue following the application of the spray which in itself was harmless.

During the past four years very extended experience with the use of phytonomic oils applied to a great variety of growing plants and under practically all weather conditions, has shown that in the great majority of cases the use of phytonomic oils has not been attended by any injury to the plants sprayed. In a small percentage of cases, however, principally where the application was made during unusually hot weather, unfavorable reactions have developed from oils elsewhere shown to be harmless and occasionally developed a sufficient extent to attract general notice.

The above-mentioned phenomena led me to make a very careful investigation of the conditions surrounding the oxidation of so-called white oils. As a result I have discovered that ordinary white oils are subject to rancidity and may become more or less phytocidal. I have further discovered that white oils need not necessarily develop rancidity at 100° C., and have perfected methods whereby I can prepare substantially pure saturated oils which are also substantially non-oxidizable so that oils which are practically stable phytonomic oils may be manufactured.

I. The white oils hitherto known to the art and obtainable under various trade names, such as "Wyrol", "Crystal oronite", "Marcol", "white oil", "Amaline", etc., may be used as a source of stable phytonomic oils. They are found to consist of two general classes of hydrocarbons; one much more readily oxidizable than the other. These groups grade into each other in a more or less continuous series and are therefore difficult to separate definitely. A practically definite separation of the less oxidizable group can, however, be made by oxidizing the more oxidizable components in a given sample and then removing the oxidation products by treatment with sulphuric acid, washing, neutralizing the unsulphonatable portion, and filtering through fuller's earth for the final removal of unsaturated compounds. The resulting white oil resists substantial oxidation at the temperature at which the original sample was run for at least as many days as this original sample was exposed. The resulting oil may therefore be said to be non-oxidizable as compared with the original sample and to constitute a stable phytonomic oil.

Examples of the effect of this oxidation treatment on such raw materials are as follows:

1a. A commercial "white oil" prepared from California base by treatment with sulfurous acid and known as Volck stock, having a specific gravity of .865 and Saybolt viscosity at 100° F. of about 100 and which by standard test for "saturation" (treatment with C. P. Conc. $H_2SO_4$) shows 100% saturated hydrocarbons, may be treated by this air oxidation process for 284 hours at a temperature ranging from 90° C. up to 110° C. The volume of the oil is found to have decreased about 12% while the sp. g. has risen to .917. When the resulting mixture is treated with concentrated sulfuric acid, washed with water, neutralized with caustic soda and finally filtered through fuller's earth, it is found that only 66% of the original amount of oil is left while 34% has shown itself capable of slow oxidation and removal. The remaining 66% however is no longer susceptible to slow oxidation as was the original white oil but is now a stable phytonomic oil.

1b. Another white oil prepared by the Standard Oil Company of New Jersey and sold under the name of Markol, having a sp. g. of .843 and a Saybolt viscosity of about 76 at 100° F. tested 100% saturated hydrocarbons. When air oxidized for 284 hours over a temperature range from 90° to 100° C. the volume loss was about 13% while the specific gravity rose to .894. Again after cleaning up as above described the loss proved to be about 34% but the remaining 66% showed vastly greater stability against slow oxidation and was much more stable under atmospheric conditions and safe to apply to plants in hot dry sunshine.

1c. A sample of white "Amaline" from L. Sonneborn Sons, Inc., New York city, was similarly examined and processed. The original white oil was 100% saturated hydrocarbons and had a gravity of about .826. Its Saybolt number was not taken. After processing as above for 161 hours over a temperature range of 105° C. to 115° C. it showed 13% loss in volume and its sp. g. rose to .872. After cleaning up as above described 36% was found to have been lost but the remaining 64% was of good phytonomic quality and was quite stable.

This oxidation indicates the presence of about 35% of unstable materials in these oils, and it is desirable to have an oil contain certainly less than 25%.

Any of these oils after oxidation, may be treated as above described to remove oxidization products and produce a substantially stable phytonomic oil. It is notable in this connection, that the resulting oil does not differ materially in gravity or viscosity from the original sample although there may have been as much as twenty-five per cent loss by evaporation during the oxidation process. Such a method of production is expensive and needlessly complicated.

II. Another method of separation is distillation under suitable conditions, for example, as follows: If a sample of commercial white oil is placed in a still and held at a temperature not materially exceeding 300° C. and a rapid stream of mixed gases, consisting of hydrogen or illuminating (water) gas and sulphur dioxide, is passed through the sample and thence through a condenser, a separation of oxidizable and relatively non-oxidizable components is effected. The residue in the still becomes progressively non-oxidizable until 60 to 70 per cent of the original sample has been distilled over. The residue may be as much as 5 times as resistant to oxidation as the original sample. The still residue is slightly cracked and can be subjected to a sulphuric acid treatment to restore it to its original pure white oil condition. In this manner also stable phytonomic oils may be produced, but at considerable expense.

In this connection it was noted that the still residue product differs from the oxidation method product, in that it is more viscous, heavier and less volatile than the original sample and that the oxidizable groups in a white oil appear to behave quite differently from the unsaturated groups in lubricating distillates, in that the latter are not generally separable by distillation. Therefore, after having thus determined the existence of relatively non-oxidizing groups in the present commercial white oils, I proceeded to examine the lubricating distillate from which these oils are derived.

I discovered that these distillates did not exhibit the same oxidation phenomena as the white oils; in other words, the lubricating distillates are must less oxidizable than the white oils produced from them by present methods. I further discovered that the partial removal of unsaturated hydrocarbons by treatment with sulphuric acid to produce oils ranging from 80 per cent to 97 per cent saturated might be so carried out that it resulted in products which were practically non-oxidizable at 100° C., and finally that further treatment with sulphuric acid to produce pure white oils could be so adjusted as not to destroy this high resistance to oxidation. I thus demonstrated the hitherto unknown fact that the essential hydrocarbons of the white oils as they naturally exist in the lubricating distillates are often highly resistant to oxidation, but that the present commercial methods of purifying them actually produce oxidizable substances or groups which were not present in the distillates and which are synthetic rather than natural components of the white oils. Thus I discovered a more direct, simple and economical method of making stable phytonomic oils. I discovered that high temperatures tended to produce such oxidizable groups and that the use of excess fuming sulphuric acid invariably produced them. Further I discovered that in this method for the preparation of non-oxidizable white oils, the removal of the final two or three per cent. of unsaturated hydrocarbons is the most critical point in the treatment of the lubricating distillates. It is just at this point that, in the standard factory process of making white oils, it is customary to use an excess of fuming sulphuric acid which accounts for the presence of readily oxidizable components in the white oils. Thus I have discovered the following processes for producing more economically the stable phytonomic oils.

III. The lubricating distillate is vigorously agitated with sulfur oxide in the form of ordinary sulphuric acid preferably not exceeding 1.84 specific gravity for a period not less than one hour at a temperature regulated preferably not to exceed 50° C., after which the sulphonic acids and sulphuric acids are allowed to separate by gravity, and the white oil is removed from the top for further purification by neutralization, washing, and filtration through fuller's earth. The amount of sulphuric acid required is from 3 to 5 times the volume of lubricating distillate if the reaction is to be completed in one operation. If, however, the operation is conducted in stages, using only a portion of the acid at a time, the relative quantity of acid may be greatly reduced. For economy the excess acid must be conserved in a recovery unit.

IV. Instead of ordinary sulphuric acid, sulfuric oxide may be used in the form of fuming sulphuric acid (20% excess $SO_3$) in carefully regulated amounts so that there shall not be more $SO_3$ than is actually required to combine with the unsaturated hydrocarbons in the lubricating distillate. This may require, for example, from 250 to 350 parts by weight of fuming acid to 500 parts by weight of the distillate. Temperature control (such that the temperature will preferably not rise above 50° C.) is very essential. As the reaction is strongly exothermic, it is practically desirable to conduct the operation in stages, when large bodies of distillate are used. In practice with the fuming acid reaction it is best to stop just short of 100% saturated (98% to 99%) and to complete the operation with an excess of 1.84 sp. g. acid.

The further treatment of the oil and the recovery of excess acid are the same as for the preceding method.

V. The removal of the great bulk of unsaturated hydrocarbons may be accomplished by another sulfur oxide in the form of liquid $SO_2$ by a solution method process, after which sulphuric oxide may be used, as above indicated, to complete the purification. As heavy lubricating distillates are not readily workable particularly at 0° C., it is advisable either to operate under pressure or to dilute with kerosene or other volatile distillate, or both. With kerosene, for example, equal parts of the diluant and lubricating stock may be used. This allows ready separation of the liquid $SO_2$ and its dissolved unsaturates from the oil. After the washing with liquid sulphur dioxide is complete, the kerosene or other light distillate may be removed, either by vacuum distillation or by gas-stream still, using, for example, a mixture of illuminating gas (water gas) and sulphur dioxide. When the kerosene or light distillate has been removed from the mixture the latter is treated with ordinary sulphuric acid and finally neutralized, washed, and filtered through fuller's earth to produce stable phytonomic oil. The sulphur dioxide process has the obvious advantage over the sulphuric acid process, in that there appears to be less possibility of altering the chemical nature of any of the components naturally occurring in the lubricating distillate, into components of the white oil, which are unduly susceptible to oxidation or other objectionable degeneration.

As specific illustrations of the results obtained by such processes of treatment I may cite the following:

Heavy lubricating distillate 21° B. (western or asphaltic base type) diluted with an equal volume of kerosene oil was treated with 20% fuming sulphuric acid until 99% saturated. The kerosene was removed by distillation at 200° C. in the mixed-gas-stream still, the residue treated with 1.84 specific gravity sulphuric acid, washed with alcohol, neutralized and filtered through fuller's earth. The product so derived tested as follows:

Saturation 100% white oil, gravity 30° B.
Volume taken for oxidation test 250 cc.
Weight 219.2 grams.
After oxidation for 284 hrs. at 90° to 110° C.
Volume 236 cc., weight 210.5 grams.
Sulphonation test 100% white oil or no oxidation.

Standard Oil Company of California 100 pale stock 24° B. (a partly refined lubricating distillate with a saturation value of 62%) was treated with excess 1.84 specific gravity sulphuric acid until 100% saturated. Washed, neutralized and filtered through fuller's earth, the product showed:

Saturation value 100% white oil, gravity of sample 30° B.
Volume taken for oxidation test 250 cc., weight 219 grams.
Sample run at 100° C. to 115° C. for 280 hrs. After 240 hrs. 20 cc. was removed for analysis and showed 2% oxidized. 40 hrs. later the total oxidation was 12%.

Processes similar to those above described by me for producing stable phytonomic oils have been applied to other raw materials and to similar materials for other purposes. For example, combined distillation and blowing with streams of air have been applied to convert a crude or partially unsaturated oil with practical completeness into alcohols, aldehydes, ketones, and acids, for the purpose of producing these bodies. Again oils have been distilled in the presence of inert gases, such as steam, to reduce the partial pressure of their vapors and facilitate the complete distillation with a minimum of cracking. And again oils have been treated with various strengths of sulphuric acid and at various temperatures according to the convenience of the acid supply and the local water and weather conditions, for the purpose of removing unsaturated bodies and other impurities and making white oils. But this has been done without observation of, or interest in, the amount of oxidizable components therein, and without any attempt to avoid the production of such bodies. Finally sulphur dioxide gas or liquid has been applied to oils for the purpose of bleaching, or sterilizing, or partially cooling and reducing the oils, but with no recognition of the peculiar function or advantage I have discovered. So far as I am aware, no one has ever applied any of these treatments to the production of stable phytonomic oils, or specially applied them to produce oils for insecticidal purposes or for any other purpose in which the poison developing action of the components thus avoided or eliminated played any rôle.

For making stable phytonomic oils I prefer one of the above mentioned processes by which it is possible to secure the elimination from heavier petroleum distillates of substantially all the phytocidal impurities and the removal therefrom of the oxidizable components and other potential sources of phytocidal components, whether originally present in the distillate or produced therein during the process of purifying it. More specifically, I prefer to use one of the processes which proceeds directly to the production of stable phytonomic oils by controlling the temperature and adjusting the intensity of the agent or agents used for eliminating phytocidal impurities until substantially no potential sources of phytocidal products remain and the tests above described reveal much less than 25% of potential plant poisons. In some severe climates and for certain plants it is sufficient to remove all except the last, most resistant portion of these potential sources of phytocidal products because the remaining 25% are so inactive and slow in producing poisons that under those conditions no injury to the plant occurs and the oil is substantially free from potential plant poisons. In other climates, where high temperatures and brilliant sunshine are prevalent, it is desirable to remove substantially all such potential sources of phytocidal substance. However, I do not wish to confine myself to any of the particular operations or combination of operations above described, or to any precise quality of oil produced, as it is likely that one or other process or product may be preferable according to the circumstances, and that further improvements in both process and product may be made.

What I desire to secure by Letters Patent is:

1. A substantially non-volatile viscous oil free from phytocidal ingredients characterized by the fact that it is when subjected to severe meteorological action of air, heat and light substantially stable against the formation of ingredients having phytocidal action.

2. A parasiticidal oil emulsion comprising substantially stable components of the lubricating stock fractions characterized by substantial freedom from unsaturated components of lubricating stock and by substantial freedom from components readily oxidizable by the weather elements air, light and heat.

3. A substantially non-volatile viscous oil free from phytocidal ingredients characterized both by the substantial absence of phytocidal impurities and by the substantial absence of components adapted to produce phytocidal products during exposure to extremes of weather.

4. A substantially non-volatile viscous oil free from phytocidal ingredients characterized both by the substantial absence of phytocidal impurities and by the substantial absence of components adapted to produce phytocidal products during exposure to severe meteorological action of air, heat and light.

5. A parasiticidal oil spray comprising a petroleum fraction practically freed from unsaturated hydrocarbons, sulphur compounds, and similar phytocidal impurities characterized by the fact that it substantially resists oxidation at 100° C. for 240 hours, as herein described.

6. As a new article of manufacture, a parasiticidal oil emulsion having a viscosity between 50 sec. and 350 sec. Saybolt, specific gravity between .8000 and .9000, boiling point between 150° C. to 400° C. substantially free from unsaturated components and which, agitated with air at 100° C. for 284 hours, does not produce more than about 25% of substances removable by 1.84 sp. g. sulphuric acid washing with caustic soda and filtration through fuller's earth.

7. A plant parasiticide comprising a substantially non-volatile viscous oil free from phytocidal ingredients characterized by the fact that it is when subjected to severe meteorological action of air, heat and light substantially stable against the formation of ingredients having phytocidal action.

8. A plant parasiticide comprising an oil which consists of substantially stable components of the lubricating stock fractions characterized by substantial freedom from unsaturated components of lubricating stock and by substantial freedom from readily oxidizable components.

9. A plant parasiticide comprising a substantially non-volatile viscous oil free from phytocidal ingredients characterized both by the substantial absence of phytocidal impurities and by the substantial absence of components adapted to produce phytocidal products during exposure to extremes of weather.

10. A plant parasiticide comprising an oil which consists of a petroleum fraction practically freed from unsaturated hydrocarbons, sulphur compounds, and similar impurities characterized by the fact that it substantially resists oxidation at 100° C. for 240 hours as herein described.

WILLIAM HUNTER VOLCK.